United States Patent
Ooshita et al.

(10) Patent No.: US 7,190,148 B2
(45) Date of Patent: Mar. 13, 2007

(54) OVERCHARGE/OVERDISCHARGE DETECTION APPARATUS, OVERCHARGE/OVERDISCHARGE DETECTION CIRCUIT, AND SEMICONDUCTOR APPARATUS

(75) Inventors: Kazuhiro Ooshita, Atsugi (JP); Akira Ikeuchi, Atsugi (JP)

(73) Assignee: Mitsumi Electric Co., Ltd. (JP)

( * ) Notice: Subject to any disclaimer, the term of this patent is extended or adjusted under 35 U.S.C. 154(b) by 0 days.

(21) Appl. No.: 11/069,201

(22) Filed: Feb. 28, 2005

(65) Prior Publication Data

US 2006/0076930 A1   Apr. 13, 2006

(30) Foreign Application Priority Data

Sep. 29, 2004  (JP)  ............................. 2004-284855

(51) Int. Cl.
    *H02J 7/00*  (2006.01)
(52) U.S. Cl. ...................................... 320/134; 324/432
(58) Field of Classification Search ............... 320/134; 429/61; 324/432

See application file for complete search history.

(56) References Cited

U.S. PATENT DOCUMENTS

| 4,703,258 | A  | * | 10/1987 | Palesch | ...................... 324/73.1 |
| 6,242,890 | B1 | * | 6/2001 | Sudo et al. | .................. 320/128 |
| 6,337,559 | B1 | * | 1/2002 | Sato | ........................... 320/134 |
| 6,664,000 | B1 | * | 12/2003 | Sonobe | ........................ 429/61 |
| 2002/0050825 | A1 | * | 5/2002 | Brown | ........................ 324/500 |
| 2003/0027036 | A1 | * | 2/2003 | Emori et al. | .................. 429/61 |

FOREIGN PATENT DOCUMENTS

JP  2003-059467  2/2003

* cited by examiner

*Primary Examiner*—Karl Easthom
*Assistant Examiner*—Samuel Berhanu
(74) *Attorney, Agent, or Firm*—Anderson Kill & Olick, PC (57) ABSTRACT

The present invention provides an overcharge/overdischarge detection apparatus includes a detection terminal being in an open state, a detection part for detecting application of voltage to the detection terminal, a switch part for switchably connecting and disconnecting a secondary battery with an external circuit, and a control part for controlling the switch part in a case where the detection part detects the application of voltage to the detection terminal.

9 Claims, 6 Drawing Sheets

OVERCHARGE/OVERDISCHARGE DETECTION APPARATUS, OVERCHARGE/OVERDISCHARGE DETECTION CIRCUIT, AND SEMICONDUCTOR APPARATUS

BACKGROUND OF THE INVENTION

1. Field of the Invention

The present invention generally relates to an overcharge/overdischarge detection apparatus, an overcharge/overdischarge detection circuit, and a semiconductor apparatus, and more particularly to a overcharge/overdischarge detection apparatus, overcharge/overdischarge detection circuit, and a semiconductor apparatus for controlling charge/discharge of a secondary battery 2. Description of the Related Art A battery pack using lithium-ion batteries is mounted as a power source for mobile devices, for example, mobile phones. The lithium-ion battery has its life-span excessively shortened when subjected to, for example, overcharge, overdischarge, overcurrent, and/or short circuiting. In order to protect the lithium-ion battery from, for example, overcharge, overdischarge, overcurrent, and/or short circuiting, a protection circuit is mounted thereto (See Japanese Laid-Open Patent Application No. 2003-59467)

The conventional battery pack, however, is not provided with a function of detecting leakage of the battery. Therefore, in a case where the battery has a leakage (e.g. electrolyte leakage), the battery is continued to be used without noticing the leakage. Such progression of leakage may lead to problems, for example, an apparatus main body being adversely affected by leaking electrolyte.

SUMMARY OF THE INVENTION

In light of the foregoing, it is an object of the present invention to provide an overcharge/overdischarge detection apparatus, an overcharge/overdischarge detection circuit, and a semiconductor apparatus for achieving reliable detection of leakage with a simple configuration.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an overcharge/overdischarge detection apparatus, an overcharge/overdischarge detection circuit, and a semiconductor apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides an overcharge/overdischarge detection apparatus including: a detection terminal being in an open state; a detection part for detecting application of voltage to the detection terminal; a switch part for switchably connecting and disconnecting a secondary battery with an external circuit; and a control part for controlling the switch part in a case where the detection part detects the application of voltage to the detection terminal.

In the overcharge/overdischarge detection apparatus according to an embodiment of the present invention, the control part may include an abnormality detection part for detecting an abnormality in the secondary battery and outputting an abnormality signal, and a logic circuit for switching off the switch part when receiving the abnormality signal from the abnormality detection part, wherein the abnormality signal are controlled for switching off the switch part.

In the overcharge/overdischarge detection apparatus according to an embodiment of the present invention, the detection terminal may include a test terminal for testing operation of the control part in accordance with an external signal, wherein the test terminal is connected to the control part.

Furthermore, the present invention provides an overcharge/overdischarge detection circuit including: a detection terminal being in an open state; a detection circuit for detecting application of voltage to the detection terminal; a switch part for switchably connecting and disconnecting a secondary battery with an external circuit; and a control part for controlling the switch part in a case where the detection circuit detects the application of voltage to the detection terminal.

In the overcharge/overdischarge detection circuit according to an embodiment of the present invention, the control part may include an abnormality detection circuit for detecting an abnormality in the secondary battery and outputting an abnormality signal, and a logic circuit for switching off the switch part when receiving the abnormality signal from the abnormality detection circuit, wherein the abnormality signal are controlled for switching off the switch part.

In the overcharge/overdischarge detection circuit according to an embodiment of the present invention, the detection terminal may include a test terminal for testing operation of the control part in accordance with an external signal, wherein the test terminal is connected to the control part.

Furthermore, the present invention provides a semiconductor apparatus including: a detection terminal being in an open state; a detection circuit for detecting application of voltage to the detection terminal; a switch part for switchably connecting and disconnecting a secondary battery with an external circuit; and a control part for controlling the switch part in a case where the detection circuit detects the application of voltage to the detection terminal.

In the semiconductor apparatus according to an embodiment of the present invention, the control part may include an abnormality detection circuit for detecting an abnormality in the secondary battery and outputting an abnormality signal, and a logic circuit for switching off the switch part when receiving the abnormality signal from the abnormality detection circuit, wherein the abnormality signal are controlled for switching off the switch part.

In the semiconductor apparatus according to an embodiment of the present invention, the detection terminal may include a test terminal for testing operation of the control part in accordance with an external signal, wherein the test terminal is connected to the control part.

Other objects and further features of the present invention will be apparent from the following detailed description when read in conjunction with the accompanying drawings.

DESCRIPTION OF THE PREFERRED EMBODIMENTS

First Embodiment

[Configuration]

Figure 1:
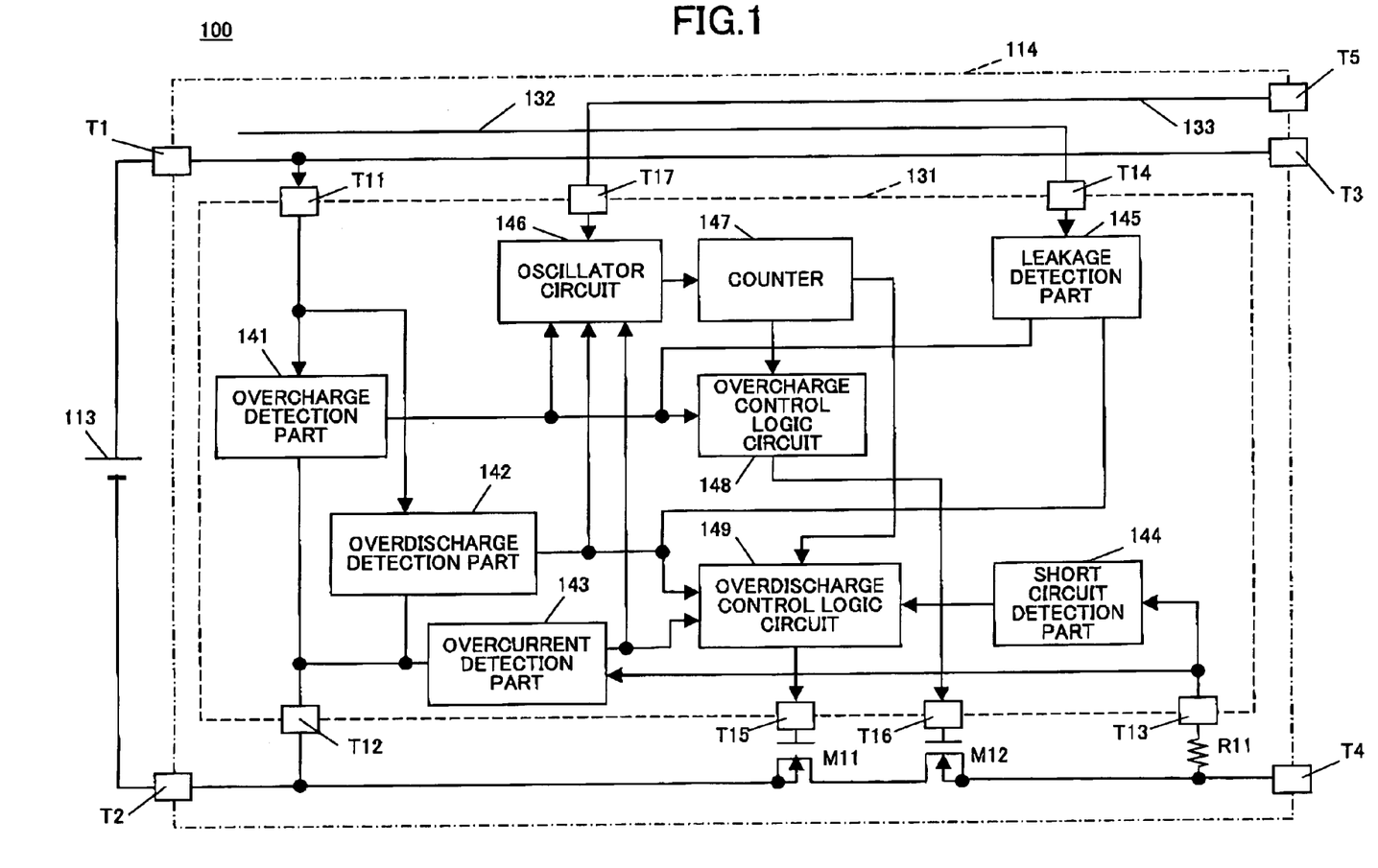
FIG. 1 is a circuit diagram showing an exemplary configuration of a battery pack according to a first embodiment of the present invention.
Figure 2:
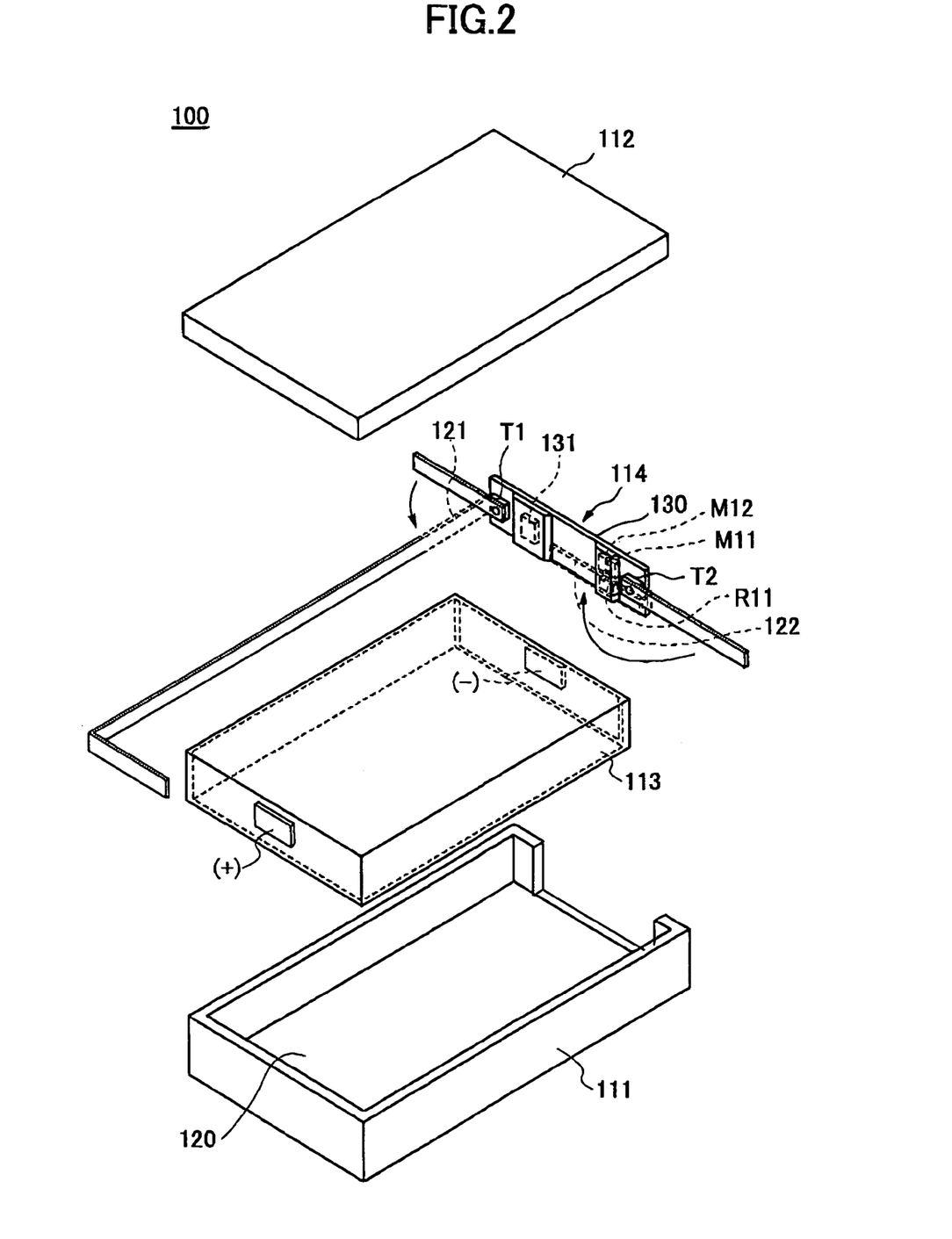
FIG. 2 is an exploded perspective drawing of a battery pack according to a first embodiment of the present invention.

FIG. 1 is a circuit diagram showing an exemplary configuration of a battery pack 100 according to a first embodiment of the present invention. FIG. 2 is an exploded perspective drawing of the battery pack 100 according to the first embodiment of the present invention.

The battery pack 100 according to the first embodiment of the present invention may be, for example, a storage battery used as a power source of a mobile device such as a mobile phone. The battery pack 100 includes, for example, a casing 111, a cover 112, a secondary battery 113, and a circuit board 114.

The casing 111 and the cover 112 may be formed of, for example, resin material. The casing 111 and the cover 112 provide a housing part 120 for housing the secondary battery 113 and the circuit board 114 therein.

The secondary battery 113 may be, for example, a lithium-ion battery. A metal plate (electrode plate) 121, which is welded to a terminal T1 of the circuit board 114, is soldered to a positive electrode of the secondary battery 113. A metal plate 122, which is welded to a terminal T2 of the circuit board 114, is soldered to a negative electrode of the secondary battery 113.

Figure 3A:
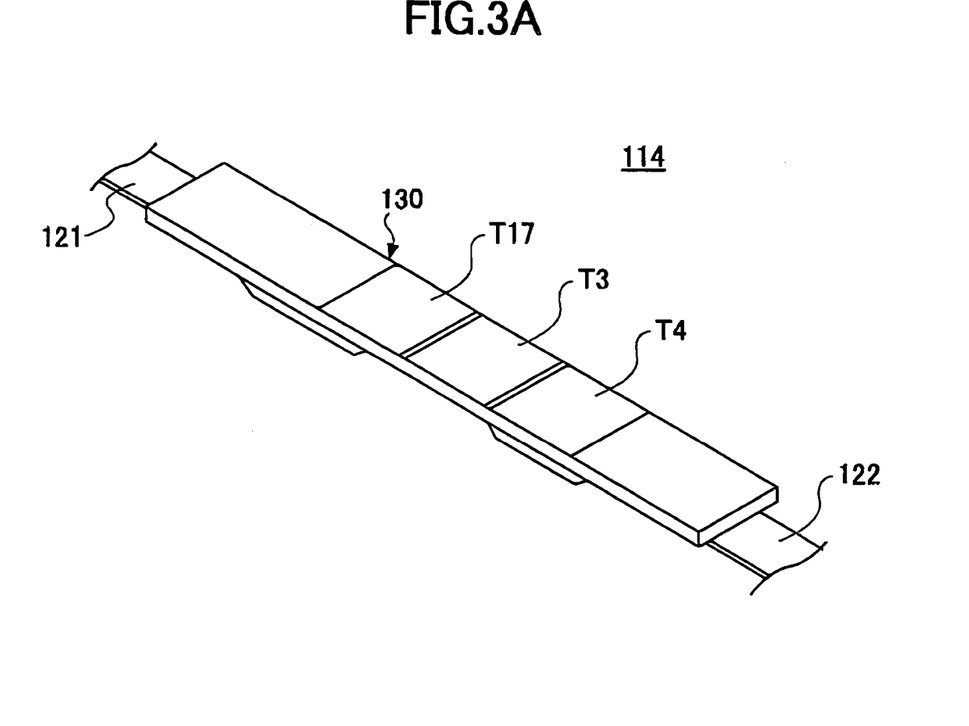
FIG. 3A is a top perspective view of a circuit board according to an embodiment of the present invention.
Figure 3B:
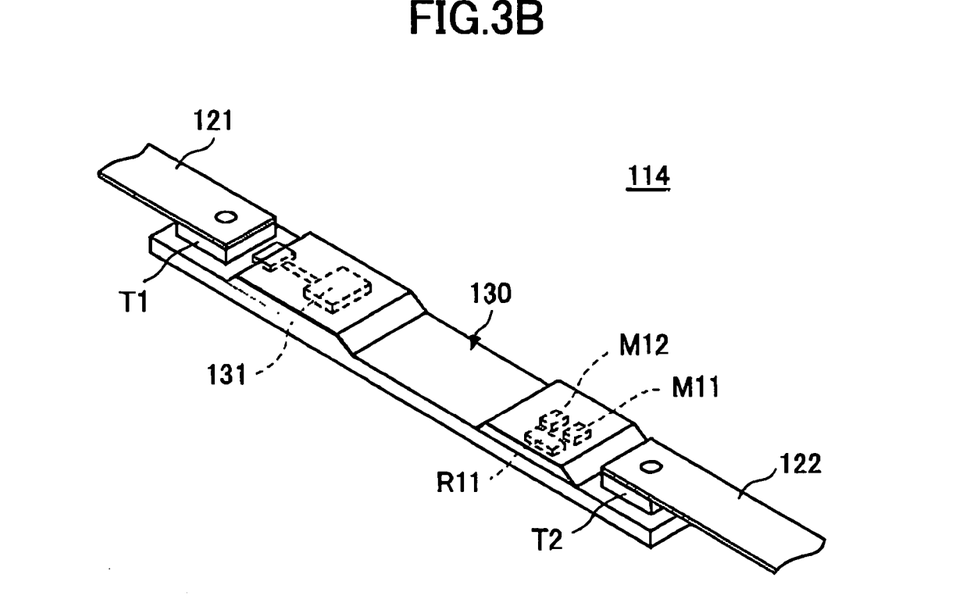
FIG. 3B is a bottom perspective view of a circuit board according to an embodiment of the present invention.

FIG. 3A is a top perspective view of the circuit board 114 according to the first embodiment of the present invention, and FIG. 3B is a bottom perspective view of the circuit board 114 according to the first embodiment of the present invention.

The circuit board 114 has an overcharge/overdischarge detection IC (Integrated Circuit) 131, transistors M11, M12, and a resistance R11 provided on a printed-wiring board 130. The transistor M11 is configured as an n channel MOS field effect transistor. The transistor M11, having a gate connected to a terminal T15 of the overcharge/overdischarge detection IC 131, controls discharge when switched off. The transistor M12 is configured as an n channel MOS field effect transistor. The transistor M12, having a gate connected to a terminal T16 of the overcharge/overdischarge detection IC 131, also restricts discharge when switched off.

The overcharge/overdischarge detection IC 131 includes an overcharge detection part 141, an overdischarge detection part 142, an overcurrent detection part 143, a short circuit detection part 144, a leakage detection part 145, an oscillator circuit 146, a counter 147, an overcharge control logic circuit 148, and an overdischarge control logic circuit 149, as shown in FIG. 1.

The overcharge detection part 141 is connected between a terminal T11 and a terminal T12 and is supplied with voltage of both ends of the secondary battery 113. The output of the overcharge detection part 141 is set as a high level when voltage of both ends of the secondary battery 113 is less than a predetermined overcharge voltage. The output of the overcharge detection part 141 is set as a low level when voltage of the secondary battery 113 is greater than the predetermined overcharge voltage (i.e. overcharge state of the secondary battery 113). It is to be noted that the predetermined overcharge voltage is set beforehand in accordance with the characteristic(s) of the secondary battery 113. The output of the overcharge detection part 141 is supplied to the oscillator circuit 146 and the overcharge control logic circuit 148.

The overdischarge detection part 142 is also connected between the terminal T11 and the terminal T12 and is supplied with voltage of both ends of the secondary battery 113. The output of the overdischarge detection part 142 is set as a high level when voltage of both ends of the secondary battery 113 is greater than a predetermined overdischarge voltage. The output of the overdischarge detection part 142 is set as a low level when voltage of the secondary battery 113 is less than the predetermined overcharge voltage (i.e. overdischarge state of the secondary battery 113). It is to be noted that the predetermined overdischarge voltage is set beforehand in accordance with the characteristic(s) of the secondary battery 113. The output of the overdischarge detection part 142 is supplied to the oscillator circuit 146 and the overdischarge control logic circuit 149.

The overcurrent detection part 143 is connected to a terminal T13. The terminal T13 is connected to a terminal T4 via a resistance R11. The terminal T4 is connected to a negative electrode of an external circuit (e.g. load). The output of overcurrent detection part 143 is set as a high level when voltage of the terminal T13 is less than a predetermined overcurrent voltage. The output of the overcurrent detection part 143 is set as a low level when voltage of the terminal T13 is greater than the predetermined overcurrent voltage (i.e. overcurrent state of the current supplied from the secondary battery 113 to the load). It is to be noted that the predetermined overcurrent voltage is set beforehand in accordance with the characteristic(s) of the secondary battery 113. The output of the overcurrent detection part 143 is supplied to the oscillator circuit 146 and the overdischarge control logic circuit 149.

The short circuit detection part 144 is connected to the terminal T13. The output of the short circuit detection part 144 is set as a high level when voltage of the terminal T13 is less than a predetermined short circuit voltage. The output of the short circuit detection part 144 is set as a low level when voltage of the terminal T13 is greater than the predetermined short circuit voltage (i.e. short circuited state of the secondary battery 113). It is to be noted that the predetermined short circuit voltage is set beforehand in accordance with the characteristic(s) of the secondary battery 113. The output of the short circuit detection part 144 is supplied to the overdischarge control logic circuit 149.

The leakage detection part 145 is connected to the terminal T14. The terminal T14 is connected to a wiring pattern 132 formed on the printed-wiring board 130. The wiring pattern 132 is extended from the terminal T14 to the vicinity of the terminal T1. The wiring pattern 132 has one end (toward terminal T14) soldered to the terminal T14 and the other end (toward the vicinity of terminal T1) provided in an open state.

The leakage detection part 145 includes, for example, an inverting amplifier. When the terminal T14 and the terminal T1 is short circuited by a liquid (e.g. electrolyte) leaking from the secondary battery 113, the liquid detection part 145, which is input with a potential of the terminal T14, detects that the potential of the terminal T14 has risen to VDD and sets its output to a low level. The output of the leakage detection part 145 is supplied to the overcharge control logic circuit 148, the overdischarge control logic circuit 149, and the oscillator circuit 146.

When any one of the outputs of the overcharge detection part 141, the overdischarge detection part 142, or the overcurrent detection part 143 is a low level, the oscillator circuit 146 starts oscillation and outputs a pulse(s). The oscillator circuit 146 is connected to a test terminal T17. The test terminal T17 is a terminal used for control during an operation test of an internal circuit part(s), for example, by using an external signal after assembly, or shipment. The test terminal T17 is connected to a test terminal T5 via a wiring pattern 133 formed on the circuit board 114. The control for testing the overcharge/overdischarge detection IC 131 is executed through the test terminal T5 formed on the circuit board 114.

The pulse output from the oscillator circuit 146 is supplied to the counter 147. The counter 147 counts the pulse output from the oscillator circuit 146. The count number of the counter 147 is supplied to the overcharge control logic circuit 148 and the overdischarge control logic circuit 149. It is to be noted that the counter is reset when the output of the overdischarge control logic circuit is switched from low level to high level.

The outputs of the overcharge detection part 141 and the leakage detection part 145 and the count number of the counter 147 are supplied to the overcharge control logic circuit 148. The output of the overcharge control logic circuit 148 is set to a low level in a case where the output of the overcharge detection part 141 and/or the leakage detection part 145 is a low level(s) and thus the count number of the counter 147 is a predetermined count number. The output of the overcharge control logic circuit 148 is set to a high level when outputs of the overcharge detection part 141 and the leakage detection part 145 and the count number of the counter 147 are in a state other than the foregoing case. The output of the overcharge control logic circuit 148 is supplied to a terminal T16. The terminal T16 is connected to a gate of the transistor M12.

The outputs of the overdischarge detection part 142, the overcurrent detection part 143, the short circuit detection part 144, and the leakage detection part 145, and the count number of the counter 147 are supplied to the overdischarge control logic circuit 149. The output of the overdischarge control logic circuit 149 is a low level in a case where the output of the short circuit detection part 144 and/or the leakage detection part 145 is a low level and thus the count number of the counter 147 is a predetermined number. The output of the overdischarge control logic circuit 149 is set to a high level when outputs of the short circuit detection part 144 and/or the leakage detection part 145 and the count number of the counter 147 are in a state other than the foregoing case. The output of the overdischarge control logic circuit 149 is supplied to a terminal T15. The terminal T15 is connected to a gate of the transistor M11.

The transistor M11 has its gate connected to the terminal T15, its source connected to a terminal T2, and its drain connected to a source of the transistor M12. The transistor M12 has its gate connected to the terminal T16, its source connected to the drain of the transistor M11, and its drain connected to the terminal T4.

As described above, the transistor M11 is configured as an n channel MOS field effect transistor. The transistor M11 is switched off when the output of the terminal T15 is a low level, and is switched on when the output of the terminal T16 is a high level. The transistor M12 is also configured as an n channel MOS field effect transistor. The transistor M12 is switched off when the output of the terminal T16 is a low level, and is switched on when the output of the terminal T16 is a high level.

In a case of overdischarge, overcurrent, short circuit, or leakage, the terminal T15 becomes a low level; thereby the transistor M11 is switched off. In a case of overcharge and leakage, the terminal becomes a high level; thereby the transistor M12 is switched off.

By switching off the transistor M11 and/or the transistor M12, the secondary battery 113 and the terminal T4 are disconnected. This causes the secondary battery 113 and the load to disconnect. Accordingly, current can be preventing from being applied to the load in a case of overcharge, overdischarge, overcurrent, short circuit, and/or leakage; thereby the secondary battery 113 can be protected.

[Operation]

An operation of the first embodiment of the present invention is described in a case where there is leakage in the secondary battery 113.

In a case where there is a leakage in the secondary battery 113, electrolyte leaks from a vicinity of the positive electrode of the secondary battery 113. The leaking electrolyte travels across the electrode plate 121 until reaching to the terminal T1 of the circuit board 114.

The electrolyte spreads in the circuit board 114 and causes a short circuit between the terminal T1 (i.e. positive electrode of the secondary battery 113) and the wiring pattern 132 when situated between the terminal T1 and the wiring pattern 132.

When a short circuit occurs between the terminal T1 and the wiring pattern 132, the terminal T14 of the overcharge/overdischarge detection IC 131 becomes a high level. When the terminal T14 of the overcharge/overdischarge detection IC 131 becomes a high level, the output of the leakage detection part 145 becomes a low level. When the output of the leakage detection part 145 becomes a low level, the inputs of the oscillator circuit 146, the overcharge control logic circuit 148, and the overdischarge control logic circuit 149 become low levels. The oscillator circuit 146 outputs a pulse when the output of the leakage detection part 145 becomes a low level. The counter 147 counts the pulse output from the oscillator circuit 146. The outputs of the overcharge control logic circuit 148 and the overdischarge control logic circuit 149 become low levels when the count number of the counter 147 reaches the predetermined count number. When the output of the overcharge control logic circuit 148 becomes a low level, the transistor M12 is switched off. When the overdischarge control logic circuit 149 becomes a low level, the transistor M11 is switched off. By switching off the transistor M11 and/or the M12, the secondary battery 113 can be disconnected from the terminal T4. That is, the secondary circuit 113 can be disconnected from an external circuit such as a load.

In the first embodiment of the present invention, when a leakage (e.g. electrolyte leakage) reaches a position between the terminal T1 and the wiring pattern 132 connected to the terminal T14, the potential of the terminal T14 rises. When the rise of the potential of the terminal T14 is detected, the secondary battery 113 is disconnected with an external circuit. Accordingly, progression of the leakage and adverse effects to the external circuit can be prevented. Furthermore, the leakage detection according to the first embodiment of the present invention can be achieved simply by adding the terminal T14 and the leakage detection part 145 since the transistors M11 and M12 are switched by controlling signals input from, for example, the overcharge detection part 141 and the overdischarge detection part 142 to the overcharge control logic circuit 148 and the overdischarge control logic circuit 149. Accordingly, only a minimal change is required for the configuration of the circuit according to the first embodiment of the present invention.

[Modified Example]

Figure 4:
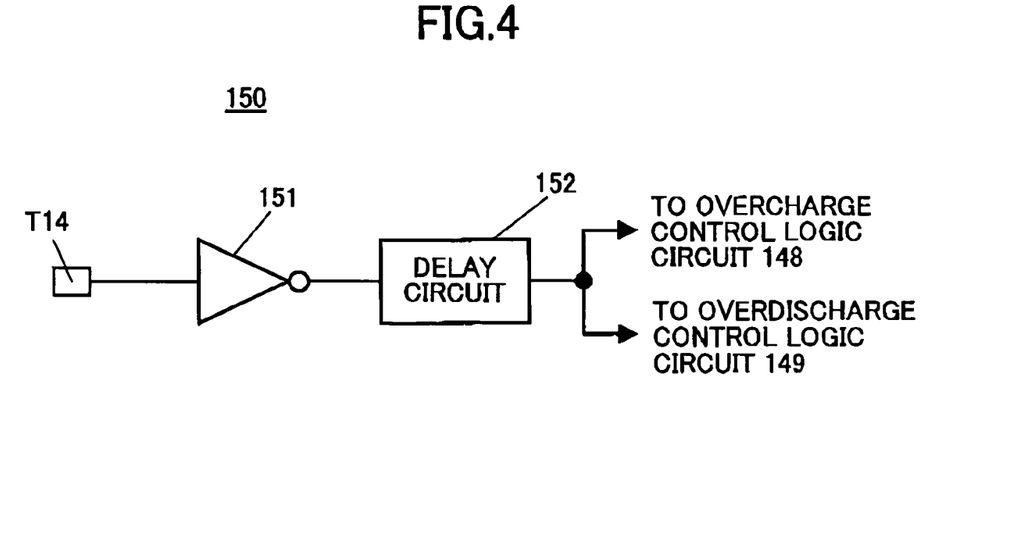
FIG. 4 is a block diagram showing a modified example of a leakage detection part according to an embodiment of the present invention.
Figure 5:
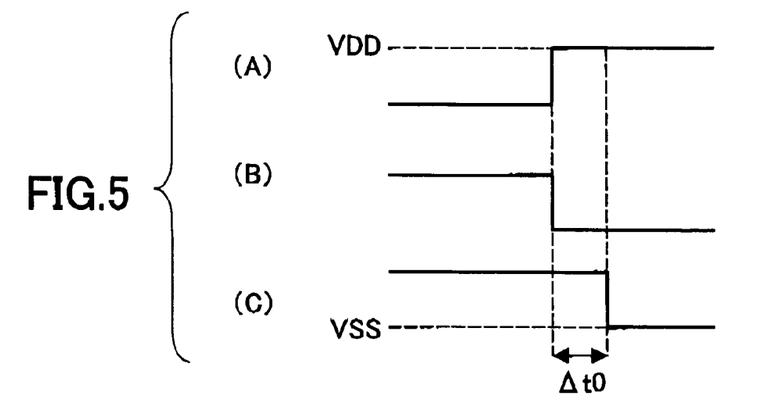
FIG. 5 is a diagram for explaining an operation of a modified example of a leakage detection part according to an embodiment of the present invention.

FIG. 4 is a block diagram showing an exemplary modified leakage detection part 150 (i.e. modification of the leakage detection part 145) according to the first embodiment of the present invention, and FIG. 5 is a diagram for explaining an operation of the exemplary modified leakage detection part 150 according to the first embodiment of the present invention. FIG. 5(A) shows an input of an inverter 151, FIG. 5(B) shows an output of the inverter 151, and FIG. 5(C) shows an output of a delay circuit 152.

The leakage detection part 150 includes the inverter 151 and the delay circuit 152. With reference to FIGS. 4, 5(A), and 5(B), the inverter 151 inverts and outputs an input from the terminal T14. The output of the inverter 151 is supplied to the delay circuit 152. The delay circuit 152 delays the output from the inverter 151 for a predetermined delay period Δt0, as shown in FIG. 5(C). The output of the delay circuit 152 is supplied to the overcharge control logic circuit 148 and the overdischarge control logic circuit 149.

With the modified leakage detection part 150, since the input from the terminal T14 is output from the inverter 151 in delayed manner to the overcharge control logic circuit 148 and the overdischarge control logic circuit 149, problems such as noise can be prevented. Accordingly, operation can be executed more steadily.

Second Embodiment

Figure 6:
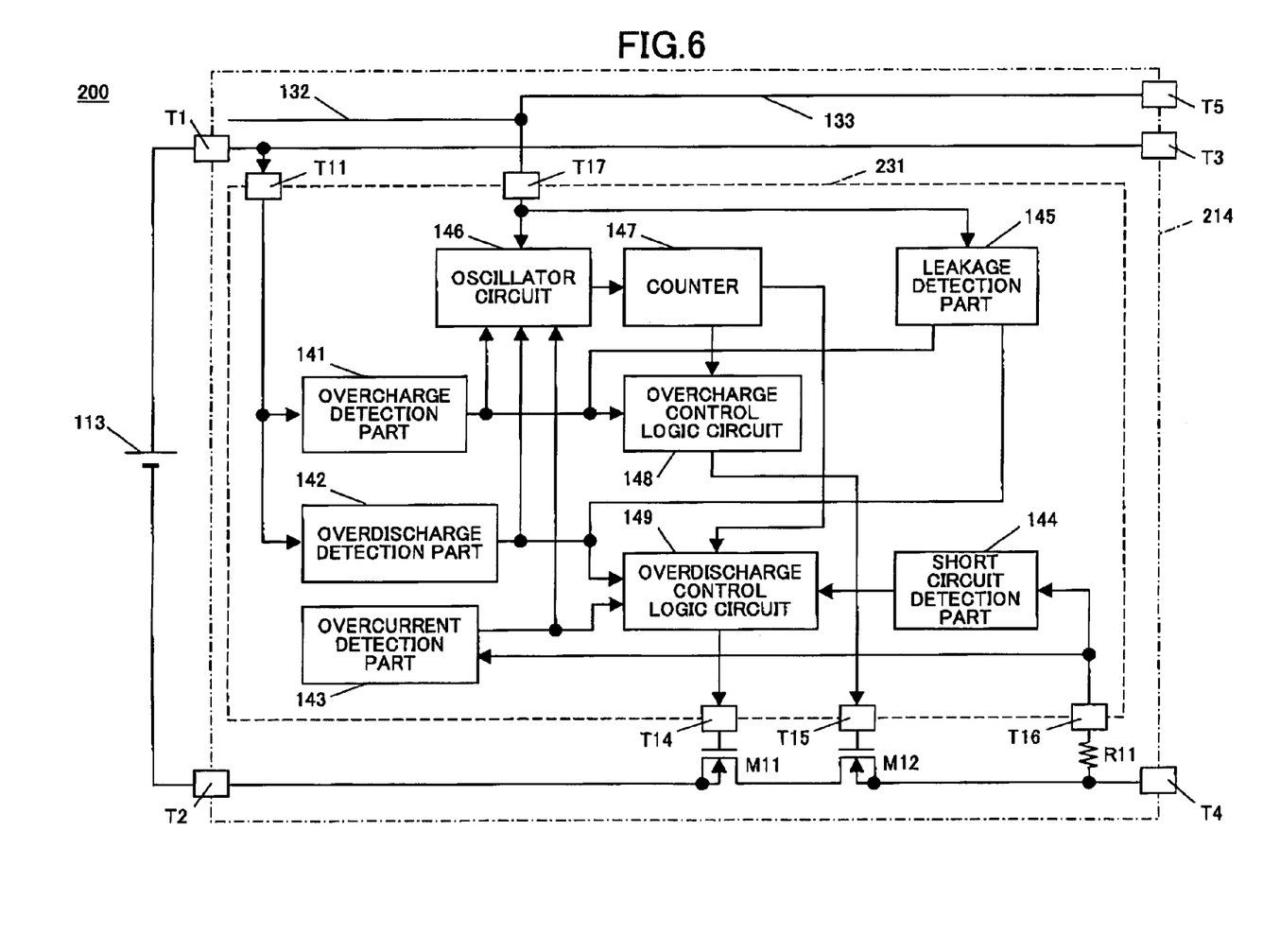
FIG. 6 is a circuit diagram showing an exemplary configuration of a battery pack according to a second embodiment of the present invention.

FIG. 6 is a circuit diagram showing an exemplary configuration of a battery pack 200 according to a second embodiment of the present invention. In FIG. 6, like components are denoted with like numerals as of the first embodiment of the present invention shown in FIG. 1, and are not further explained.

The battery pack 200 includes a circuit board 214 which is configured differently from that of the first embodiment of the present invention. In the circuit board 214, the test terminal T17 of an overcharge/overdischarge detection IC 231 is configured to serve also as the terminal T14 provided for leakage detection in the first embodiment of the present invention.

The test terminal T17 of the overcharge/overdischarge detection IC 231 is connected to the test terminal T5 for connecting to the outside and is also connected to one end of the wiring pattern 132. Furthermore, the test terminal T17 is connected to the oscillator 146 and the leakage detection part 145 inside the overcharge/overdischarge detection IC 231.

Third Embodiment

Figure 7:
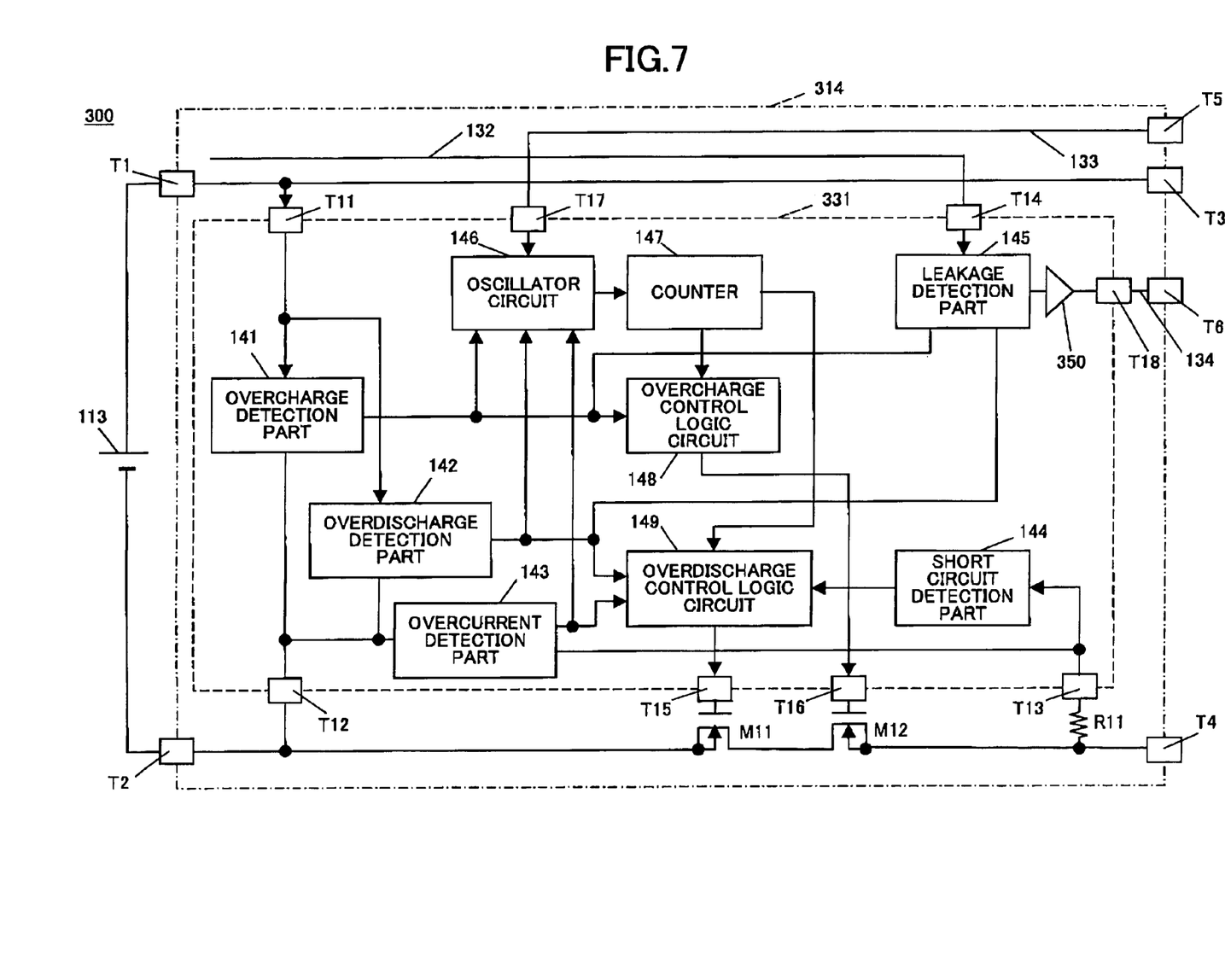
FIG. 7 is a circuit diagram showing an exemplary configuration of a battery pack according to a third embodiment of the present invention.

FIG. 7 is a circuit diagram showing an exemplary configuration of a battery pack 300 according to a third embodiment of the present invention.

The battery pack 300 includes a circuit board 314 which is configured differently from that of the first embodiment of the present invention. The circuit board 314 includes a leakage reporting terminal T6 serving as a terminal for reporting a leakage. The terminal T6 is connected to a higher level apparatus when the battery pack 300 is mounted on an apparatus.

In the circuit board 314, the leakage reporting terminal T6 is connected to another leakage reporting terminal T18 of an overcharge/overdischarge detection IC 331 via a wiring pattern 134. In the overcharge/overdischarge detection IC 331, the output of the leakage detection part 145 is connected to the leakage reporting terminal T18 via a buffer 350.

Accordingly, a leakage detection signal obtained from the leakage detection part 145 can be output to an external circuit, to thereby report a leakage of the battery pack 300. Therefore, the user can be informed of the cause for the cease of the power supply.

It is to be noted that an LED, for example, may be employed for reporting the leakage of the battery pack 300 to the user.

Further, the present invention is not limited to these embodiments, but variations and modifications may be made without departing from the scope of the present invention.

The present application is based on Japanese Priority Application No. 2004-284855 filed on Sep. 29, 2004, with the Japanese Patent Office, the entire contents of which are hereby incorporated by reference.

What is claimed is:

1. An overcharge/over discharge detection apparatus for a battery pack having a secondary battery comprising:
   a primary terminal connected to a positive terminal of the secondary battery;
   a detection terminal having a first end and a second end;
   a wiring pattern having opposite ends with one end connected to the first end of the detection terminal and with the opposite end being open at a location in the vicinity of the primary terminal;
   a detection part connected to the second end of the detection terminal for detecting a change in voltage level at said detection terminal resulting from the primary terminal being short circuited to the open end of the wiring pattern by a liquid leakage of electrolyte from the secondary battery in said battery pack;
   a switch part for switchably connecting and disconnecting the secondary battery with an external circuit; and
   a control part for controlling the switch part in a case where the detection part detects the change in voltage at the detection terminal.

2. The overcharge/over discharge detection apparatus as claimed in claim 1,
   wherein the control part includes
   an abnormality detection part for detecting an abnormality in the secondary battery and outputting an abnormality signal, and
   a logic circuit for switching off the switch part when receiving the abnormality signal from the abnormality detection part,
   wherein the abnormality signal are controlled for switching off the switch part.

3. The overcharge/over discharge detection apparatus as claimed in claim 1, wherein the detection terminal includes a test terminal for testing operation of the control part in accordance with an external signal, wherein the test terminal is connected to the control part.

4. An overcharge/over discharge detection circuit for a battery pack having a secondary battery comprising:
   a primary terminal connected to a positive terminal of the secondary battery;

a detection terminal having a first end and a second end;

a wiring pattern having opposite ends with one end connected to the first end of the detection terminal and with the opposite end being open at a location in the vicinity of the primary terminal;

a detection circuit connected to the second end of the detection terminal for detecting a change in voltage level at said detection terminal resulting from the primary terminal being short circuited to the open end of the wiring pattern by a liquid leakage of electrolyte from the secondary battery in said battery pack;

a switch part for switchably connecting and disconnecting the secondary battery with an external circuit; and a control part for controlling the switch part in a case where the detection circuit detects the change in voltage at the detection terminal.

5. The overcharge/over discharge detection circuit as claimed in claim 4, wherein the control part includes an abnormality detection circuit for detecting an abnormality in the secondary battery and outputting an abnormality signal, and a logic circuit for switching off the switch part when receiving the abnormality signal from the abnormality detection circuit, wherein the abnormality signal are controlled for switching off the switch part.

6. The overcharge/over discharge detection circuit as claimed in claim 4, wherein the detection terminal includes a test terminal for testing operation of the control part in accordance with an external signal, wherein the test terminal is connected to the control part.

7. A semiconductor apparatus for a battery pack having a secondary battery comprising:

a primary terminal connected to a positive terminal of the secondary battery;

a detection terminal having a first end and a second end;

a wiring pattern having opposite ends with one end connected to the first end of the detection terminal and with the opposite end being open at a location in the vicinity of the primary terminal;

a detection circuit connected to the second end of the detection terminal for detecting a change in voltage level at said detection terminal resulting from the primary terminal being short circuited to the open end of the wiring pattern by a liquid leakage of electrolyte from the secondary battery in said battery pack a switch part for switchably connecting and disconnecting the secondary battery with an external circuit; and a control part for controlling the switch part in a case where the detection circuit detects the change in voltage at the detection terminal.

8. The semiconductor apparatus as claimed in claim 7, wherein the control part includes an abnormality detection circuit for detecting an abnormality in the secondary battery and outputting an abnormality signal, and a logic circuit for switching off the switch part when receiving the abnormality signal from the abnormality detection circuit, wherein the abnormality signal are controlled for switching off the switch part.

9. The semiconductor apparatus as claimed in claim 7, wherein the detection terminal includes a test terminal for testing operation of the control part in accordance with an external signal, wherein the test terminal is connected to the control part.

* * * * *